No. 618,639. Patented Jan. 31, 1899.
J. H. BULLARD.
CLAMP FOR SADDLE POSTS, &c.
(Application filed July 18, 1898.)
(No Model.)
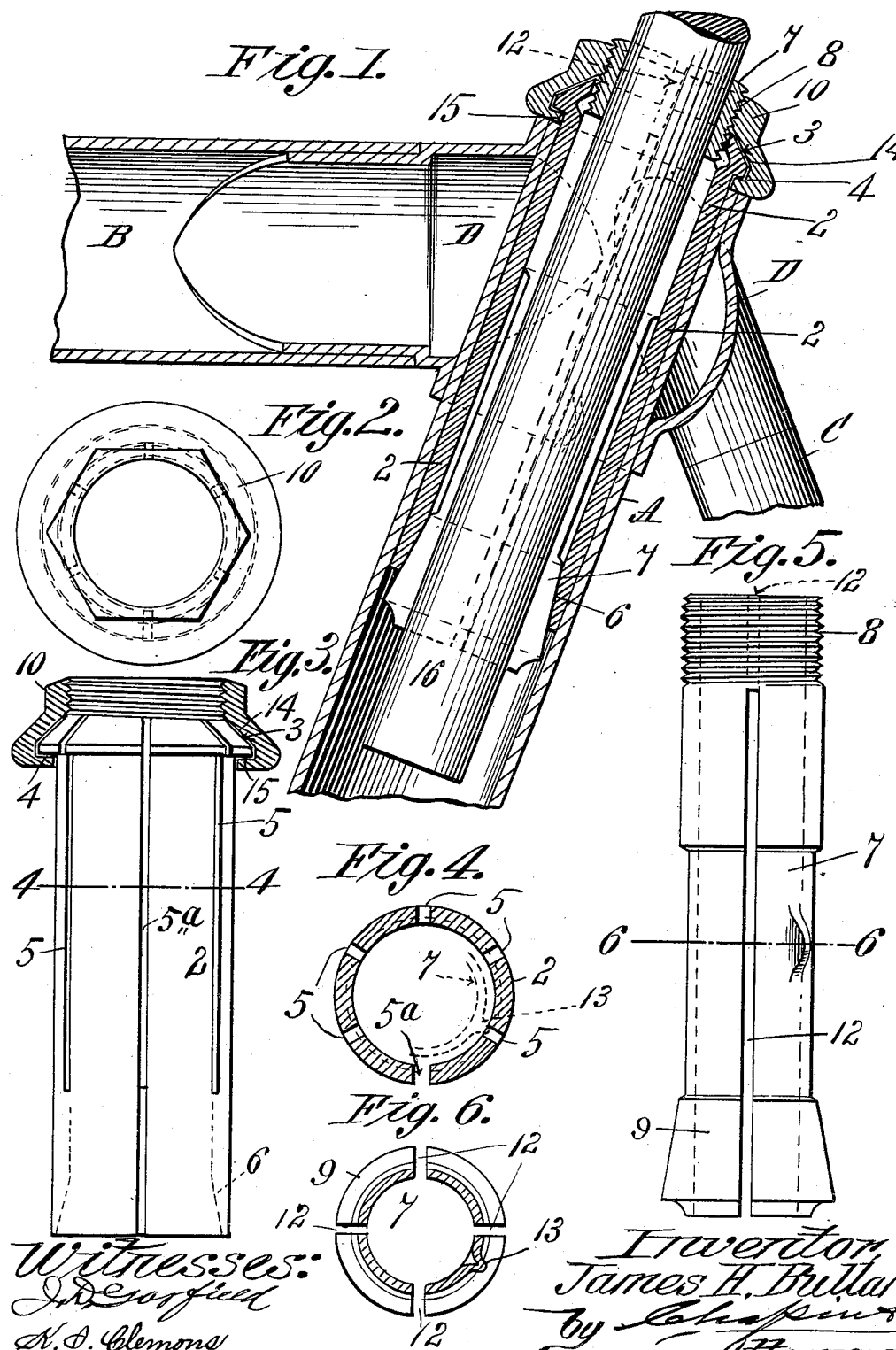

UNITED STATES PATENT OFFICE.

JAMES H. BULLARD, OF SPRINGFIELD, MASSACHUSETTS.

CLAMP FOR SADDLE-POSTS, &c.

SPECIFICATION forming part of Letters Patent No. 618,639, dated January 31, 1899.

Application filed July 18, 1898. Serial No. 686,250. (No model.)

*To all whom it may concern:*

Be it known that I, JAMES H. BULLARD, a citizen of the United States of America, residing at Springfield, in the county of Hampden and State of Massachusetts, have invented new and useful Improvements in Clamps for Saddle-Posts, &c., for Bicycles, of which the following is a specification.

This invention relates to bicycles, and particularly to clamps for saddle or handle-bar posts of that class wherein one operating-nut serves to secure the clamp in the frame of the machine and at the same time clamp the post of a saddle or handle-bar; and the object of the invention is to improve the construction of a clamp of this class whereby the clamping force of the device is exerted simultaneously at both ends thereof and thereby rendered much more efficient in operation; and the invention consists in the construction as hereinafter fully described, and particularly pointed out in the claims.

In the drawings forming part of this specification, Figure 1 is an enlarged sectional elevation of a part of the frame of a bicycle which receives the saddle-post, part of the latter being in plain elevation. Fig. 2 is a plan view of the top of the saddle-post clamp. Fig. 3 is a side elevation of the part of the clamp fitting in the tubular frame of the machine and having the operating-nut thereon in section. Fig. 4 is a section of Fig. 3 on line 4 4. Fig. 5 is a side elevation of another part of the clamp fitting within the part shown in Fig. 3. Fig. 6 is a section on line 6 6, Fig. 5.

Referring to the drawings, A represents the vertically-located tubular member of the frame of a bicycle, the upper end of which receives the saddle-post clamp. The top bar B and the vertical rear braces C of the frame are united to said tubular member A near its said upper end in the usual manner by a forging or stamping D. The upper ends of the said stamping D and the frame member A are squared off in a plane at right angles to the axis of said member A. Within the end of the latter is inserted the bushing 2, having a head 3 thereon tapered from the upper end of said bushing to the edge of the head 3, which is slightly larger in diameter than said bushing, and the under side thereof is turned off at right angles to said bushing, forming a shoulder 4. Said bushing is circular in cross-section, as is also its tapered head, and a number of cuts 5 $5^a$ are made through the wall thereof, located at even distances apart and extending from the upper extremity thereof downward far enough to impart to said bushing a sufficient degree of compressibility. One of said cuts $5^a$ is extended through the entire length of the bushing, thus permitting the contraction or expansion of said bushing through it entire length. The bushing 2 is tapered on its inner surface from the lower end thereof inward for a short distance, as shown at 6, Fig. 1. Within said bushing is located the sleeve 7, somewhat longer than said bushing. The upper end of said sleeve is provided with the screw-thread 8 in its outer surface and the lower end is provided with the tapered portion 9, which has the same angle as the taper on the lower inner end of the bushing 2; but the diameter of the tapered end of said sleeve is somewhat greater than the inside diameter of the end of the bushing 2. When said sleeve is inserted in operative position in said bushing, the threaded end of said sleeve will project far enough beyond the end of the bushing to be engaged by a nut 10 when the lower tapered end of the sleeve comes to a bearing against the tapered portion of the bushing.

A number of cuts 12 are made through the wall of the sleeve 7, extending from the lower end thereof nearly up to the threaded part thereof, and one of said cuts extends the entire length of the sleeve, as shown in dotted lines in Figs. 1 and 5, thereby permitting its contraction or expansion throughout its entire length.

To prevent the sleeve 7 from turning in the bushing 2 when the nut 10 is operated to draw said sleeve into said bushing, a boss 13 is located on the wall of said sleeve and projects outwardly therefrom, as shown, for a sliding engagement with the cut $5^a$ in the bushing 2. The preferred manner of making said boss is to turn down the body of the sleeve along the central part thereof, as shown in the drawings, to the proper thinness and forcing in suitable dies a portion of that wall outward in the form of the boss shown. If desired, however, the said boss may be brazed onto the wall of the sleeve or secured thereto or formed thereon in any other convenient manner.

The nut 10, to which reference has been made, is shown in plan and section in Figs. 2 and 3 and is the operating-nut whereby the upper extremity of the bushing 2 and the two extremities of the sleeve 7 are compressed. Said nut is threaded for a short distance from its top for engagement with the threaded end of the sleeve 7, and below said threaded portion of the nut the latter is chambered out, forming the cavity 14 for the reception of the head 3 of the bushing. The sides of said cavity are tapered to correspond with the tapered head 3 of the bushing, the circular opening 15 in the lower side of the said nut resulting from the form of said cavity 14 being of less diameter than said head 3. The end of said bushing on which the head 3 is located is, as stated, made contractible by the cuts 5 made therein, and said nut when placed on said tapered head may by pressure be forced down over said head, contracting it sufficiently to permit said head to enter the chamber 14, and which head, by reason of the spring-like nature of the longitudinally-divided walls of the bushing, springs back to its normal shape after passing through said opening 15 in the nut and completely fills said cavity, the nut being freely revoluble on said headed end of the bushing.

The upper part of the nut 10 is of the usual hexagon form for the reception of a wrench for operating it.

The drawings show the clamp adapted to the saddle-post 16 of a bicycle; but it is equally adapted to the handle-bar post of the machine.

The assembling and operation of the device are as follows: The operating-nut 10 is first sprung over the head 3 of the bushing 2, and the sleeve 7 is then inserted in said bushing, the boss 13 being entered in the cut 5ᵃ thereof and the threaded end of said sleeve being entered into the threaded part of the nut 10. The latter is turned until the sleeve is drawn into the bushing far enough to bring the tapered lower end of the sleeve to a bearing on the tapered inner surface of the lower end of the bushing. The post 16 of a saddle or other piece which it may be adapted to is then passed through the sleeve 7, and the said post and the clamp are then inserted in the end of the tubular part into which they are to be secured, said bushing 2 being designed to fit said tubular part without much "play." When the parts are finally located in the position shown in Fig. 1, a wrench is applied to the operating-nut 10, which is turned to draw the sleeve up into the bushing. This action draws the lower tapered end 9 of said sleeve against the tapered end 6 of the bushing, expanding it forcibly against the wall of the tubular part A of the frame, and the bearing for the nut during this movement is against the tapered head 3 of said bushing. Both the bushing 2 and the sleeve 7 are split from end to end by one longitudinal cut, and the headed end of the bushing and the lower tapered end of the sleeve are rendered easily compressible and expansible by other longitudinal cuts through their walls, extending from one end toward the other thereof, and therefore the lower end of said bushing is easily expanded against said tubular part of the frame A by the tapered end 9 of the sleeve, and the latter, also easily compressible, is forced by the same wedge action of the parts against the post passing through it. The nut 10, bearing on the tapered head of the bushing 2, not only serves to draw said sleeve upward and force the bushing downward, but by reason of the tapered bearing of the said nut on the end of said bushing contracts said end of the bushing about the end of the sleeve, also contractible, thus forcibly closing the latter on the said post 16 practically throughout the entire length of the sleeve. The release of the post from the compression of the clamp is obtained by turning the nut 10 in the direction opposite to that required for tightening the clamp, the action of the parts being such that the sleeve and the bushing are forcibly separated by the turning of the nut just as they are forcibly tightened thereby.

It is readily apparent that the efficiency of this device which clamps the post at both ends of the sleeve is greatly superior to one which clamps it only at one end.

Having thus described my invention, what I claim, and desire to secure by Letters Patent, is—

1. A clamp for a cylindrical object comprising a longitudinally-split bushing having interior and exterior tapered surfaces beginning at opposite ends thereof, a longitudinally-split sleeve located within said bushing, a screw-thread on one end of said sleeve and a taper surface on the opposite end thereof for engagement with the inner tapered surface of said bushing, a nut revolubly secured to the opposite end of said bushing and bearing on the outer tapered surface thereof, said nut having a threaded portion engaging the threaded end of said sleeve, and means for preventing the rotation of said sleeve in said bushing, substantially as described.

2. A clamp for cylindrical objects comprising a bushing, a longitudinal cut through the wall of said bushing extending from end to end, and a plurality of similar cuts extending from one end thereof toward the other, a tapered outer surface on said end containing said plurality of cuts, and an interior tapered surface at the opposite end thereof; a nut having a cavity therein for the reception of the outer tapered end of said bushing, a screw-thread in said nut, a longitudinally-split sleeve located in said bushing, a screw-thread on one end of said sleeve, and a tapered outer surface on the opposite end thereof for engaging the interior tapered surface of said bushing, said nut engaging the threaded end of said sleeve for drawing the latter forcibly into said bushing, substantially as described.

JAMES H. BULLARD.

Witnesses:
WM. H. CHAPIN,
K. I. CLEMONS.